(12) United States Patent
Baek et al.

(10) Patent No.: US 11,336,322 B2
(45) Date of Patent: May 17, 2022

(54) HIGH FREQUENCY COMMUNICATION APPARATUS FOR VEHICLE

(71) Applicant: Samsung Electronics Co., Ltd., Gyeonggi-do (KR)

(72) Inventors: Houn Baek, Gyeonggi-do (KR); Jeonghoon Lee, Gyeonggi-do (KR); Jihyuk Lim, Gyeonggi-do (KR); Young Heo, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 17/098,515

(22) Filed: Nov. 16, 2020

(65) Prior Publication Data
US 2021/0152209 A1 May 20, 2021

(30) Foreign Application Priority Data
Nov. 15, 2019 (KR) .......................... 10-2019-0146952

(51) Int. Cl.
*H04B 1/44* (2006.01)
*H04B 1/04* (2006.01)
(Continued)

(52) U.S. Cl.
CPC ................. *H04B 1/44* (2013.01); *H04B 1/04* (2013.01); *H04B 1/1607* (2013.01); *H04B 1/3822* (2013.01)

(58) Field of Classification Search
CPC .......... H04B 1/44; H04B 1/04; H04B 1/1607; H04B 1/3822
See application file for complete search history.

(56) References Cited

U.S. PATENT DOCUMENTS 9,191,903 B2 11/2015 Sasson
9,338,823 B2 5/2016 Saban et al.
(Continued)

FOREIGN PATENT DOCUMENTS

| KR | 10-2016-0033642 A | 3/2016 |
| KR | 10-2019-0124382 A | 11/2019 |
| WO | 2016/131053 A1 | 8/2016 |

OTHER PUBLICATIONS

International Search Report dated Feb. 22, 2021.
European Search Report dated Mar. 19, 2021.

*Primary Examiner* — Sophia Vlahos
(74) *Attorney, Agent, or Firm* — Cha & Reiter, LLC

(57) ABSTRACT

Provided is a high frequency communication apparatus for vehicle. The high frequency communication apparatus includes a single cable; a communication module connected to an end of the single cable and configured to transmit a radio frequency (RF) signal and a transmit (TX) serial communication signal, the communication module including a TX serial communication modulation circuit and a receive (RX) serial communication demodulation circuit; and an antenna module connected to the other end of the single cable and configured to receive and branch the RF signal and the TX serial communication signal, the antenna module including a front end module, a TX serial communication demodulation circuit, a controller configured to receive a demodulated TX serial communication signal to control the front end module and output an RX serial communication signal, and an RX serial communication modulation circuit.

20 Claims, 7 Drawing Sheets

(51) Int. Cl.
    *H04B 1/16*         (2006.01)
    *H04B 1/3822*     (2015.01)

(56)            References Cited

U.S. PATENT DOCUMENTS

| | | |
|---|---|---|
| 9,647,716 B2 | 5/2017 | Hammerschmidt |
| 2012/0328057 A1 | 12/2012 | Kroeger et al. |
| 2015/0038191 A1 | 2/2015 | Zander |
| 2016/0156456 A1 | 6/2016 | Sarca |
| 2020/0335852 A1* | 10/2020 | Cherdak .............. H04B 1/0458 |

\* cited by examiner

HIGH FREQUENCY COMMUNICATION APPARATUS FOR VEHICLE

CROSS-REFERENCE TO RELATED APPLICATION

This application is based on and claims priority under 35 U.S.C. § 119 to Korean Patent Application No. 10-2019-0146952, filed on Nov. 15, 2019, in the Korean Intellectual Property Office, the disclosure of which is incorporated by reference herein in its entirety.

BACKGROUND

1. Field

One or more embodiments of the instant disclosure generally relate to a high frequency communication apparatus for vehicle.

2. Description of Related Art

Vehicles are commonly known as machines for transportation, which move by reaction from friction of wheels attached to the car body against the road surface caused by artificial power rather than human or animal power. Vehicles may include, for example, three- or four-wheel vehicles, two-wheel vehicles such as motorcycles, construction machinery, bicycles, train traveling along rail tracks, and the like.

A vehicle may be equipped with electronic devices that provide various kinds of information to provide entertainment to the user (e.g., the driver and/or passenger) and other user convenience. An electronic device may do this by receiving and processing or not processing an external signal, and there are many different kinds of electronic devices for vehicle released on the market. Signals required to operate these electronic devices may be received through a communication apparatus for vehicle. As the amount of information to be provided for the vehicle and the user increases, high frequency communication such as communication using fifth generation (5G) or vehicle to everything (V2X) protocols is required. V2X communication is a communication scheme that enables autonomous and safe driving through connection and communication of vehicle to vehicle, vehicle to infrastructure, vehicle to pedestrian, etc., and uses e.g., the 5.9 GHz frequency band. Likewise, 5G communication supports high data rate and low latency using high frequencies of 3.5 GHz or higher. A communication module and an antenna module may be installed a few meters away from each other in the vehicle due to design constraints, in which case the high frequency may result in signal loss in the cable connecting the communication module and the antenna module.

SUMMARY

One or more embodiments of the instant disclosure provide a high frequency communication apparatus for vehicle capable of controlling operation of an antenna in an antenna module using a cable and the antenna module.

One or more embodiments of the instant disclosure also provide a high frequency communication apparatus for vehicle capable of controlling another device using a cable and an antenna module.

Technical objectives of the disclosure are not limited thereto, and there may be other technical objectives.

Additional aspects will be set forth in part in the description which follows and, in part, will be apparent from the description, or may be learned by practice of the presented embodiments of the disclosure.

According to an aspect of the disclosure, a high frequency communication apparatus for vehicle using a single cable includes a communication module connected to an end of the single cable and configured to transmit a radio frequency (RF) signal and a transmit (TX) serial communication signal, the communication module including a TX serial communication modulation circuit configured to modulate the TX serial communication signal from a first digital signal to a first alternate current (AC) signal in a first frequency band different from a second frequency band of the RF signal, and a receive (RX) serial communication demodulation circuit configured to demodulate a modulated RX serial communication signal received through the single cable to a second digital signal; and an antenna module connected to the other end of the single cable and configured to receive and branch the RF signal and the TX serial communication signal, the antenna module including a front end module configured to process the RF signal, a TX serial communication demodulation circuit configured to demodulate the TX serial communication signal from the first AC signal to the first digital signal, a controller configured to receive the demodulated TX serial communication signal to control the front end module and output an RX serial communication signal, and an RX serial communication modulation circuit configured to modulate the RX serial communication signal to a second AC signal in a third frequency band different from the second frequency band of the RF signal and the first frequency band of the TX serial communication signal.

The RF signal may be transmitted or received according to a time division duplex scheme or a frequency division duplex scheme.

The communication module may further include a TX/RX control signal modulation circuit configured to modulate a TX/RX control signal to control TX/RX mode of the RF signal from a third digital signal to a third AC signal, wherein a fourth frequency band of the third AC signal of the TX/RX control signal is different from the second frequency band of the RF signal, the first frequency band of the TX serial communication signal, and the third frequency band of the RX serial communication signal, and the antenna module may further include a TX/RX control signal demodulation circuit configured to demodulate a transmitted TX/RX control signal from the third AC signal to the third digital signal.

The communication module may further include a power circuit configured to supply power to the antenna module via the single cable.

The antenna module may further include a device configured to perform functions other than wireless communication or a serial communication interface configured to control the device, and the TX/RX serial communication signal may include a control command or data for the device.

The antenna module may be installed at a wing mirror and the device may include a turn indication lamp.

The antenna module may be installed at a front window, and the device may include at least one of a rain sensor, a tollgate passing terminal module, a radar module, or a proximity sensor.

The communication module may be configured to transmit or receive a plurality of RF signals having different frequencies or are in different communication schemes, and the antenna module may include a plurality of antennas and a plurality of front end circuits corresponding to the plurality of RF signals, and the controller may be further configured to control the plurality of antennas and the plurality of front end circuits.

The plurality of RF signals may include at least one of a vehicle to everything (V2X) communication signal, a mobile communication signal, a short-range communication signal, a satellite digital radio service (SDARS) signal, or a global positioning system (GPS) signal.

The single cable may be a coaxial cable.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
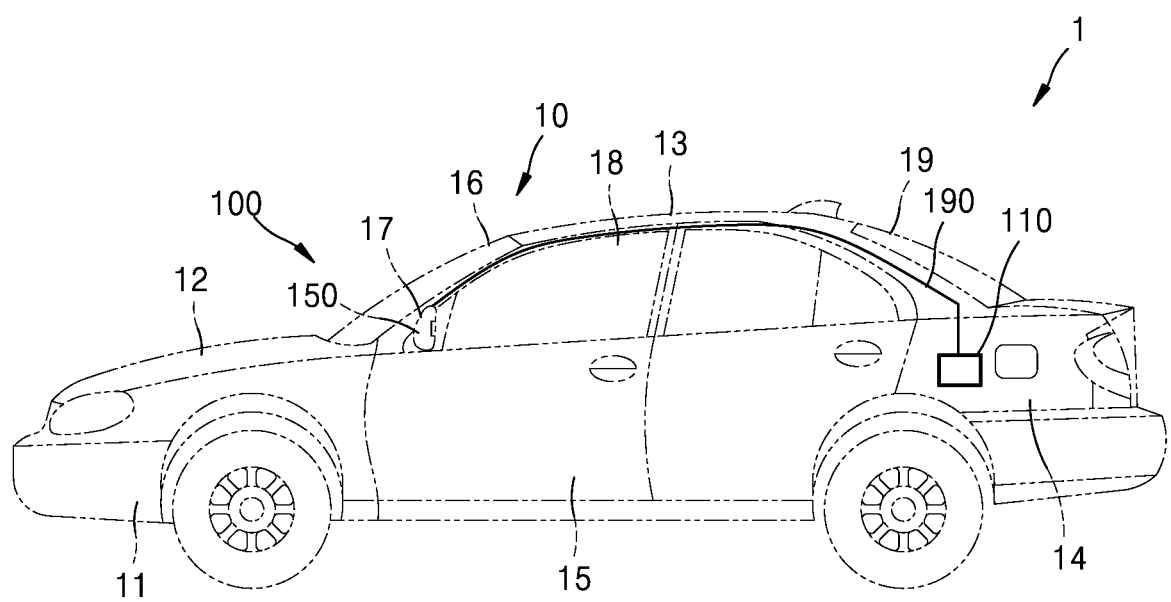
FIG. 1 shows a car body of a vehicle, according to an embodiment of the disclosure.

Embodiments of the disclosure will now be described with reference to accompanying drawings. Like reference numerals indicate like elements in the drawings, and the elements may be exaggerated in size for clarity and convenience of explanation. Embodiments of the disclosure as will be described below are illustrative examples, and there may be various modifications to the embodiments of the disclosure.

The terms are selected from among common terms widely used at present, taking into account principles of the disclosure, which may however depend on intentions of those of ordinary skill in the art, judicial precedents, emergence of new technologies, and the like. Some terms as herein used are selected at the applicant's discretion, in which case, the terms will be explained later in detail in connection with embodiments of the disclosure. Therefore, the terms should be defined based on their meanings and descriptions throughout the disclosure.

It is to be understood that the singular forms "a," "an," and "the" include plural references unless the context clearly dictates otherwise. The term "include (or including)" or "comprise (or comprising)" is inclusive or open-ended and does not exclude additional, unrecited elements or method steps, unless otherwise mentioned.

The terms "unit," "module," "block," etc., as used herein each represent a unit for handling at least one function or operation, and may be implemented in hardware, software, or a combination thereof.

Throughout the disclosure, the expression "at least one of a, b or c" indicates only a, only b, only c, both a and b, both a and c, both b and c, all of a, b, and c, or variations thereof.

The expression "configured to" as herein used may be interchangeably used with "suitable for," "having the capacity to," "designed to," "adapted to," "made to," or "capable of" according to the given situation. The expression "configured to" may not necessarily mean "specifically designed to" in terms of hardware. For example, in some situations, an expression "a system configured to do something" may refer to "an entity able to do something in cooperation with" another device or parts. For example, "a processor configured to perform A, B and C functions" may refer to a dedicated processor, e.g., an embedded processor for performing A, B and C functions, or a general purpose processor, e.g., a Central Processing Unit (CPU) or an application processor that may perform A, B and C functions by executing one or more software programs stored in a memory.

Throughout the specification, the term "communication module" may refer to a circuit separated from but connected by a cable to an antenna module in a high frequency communication apparatus for vehicle.

The antenna module may refer to a circuit having an antenna installed directly on a circuit board or connected to an antenna by a very short cable. Herein, the term "very short cable" may refer to a cable that is sufficiently short such that signal loss due to high frequency is negligible. For example, a very short cable may have a length of a few millimeters, a few centimeters, or tens of centimeters.

In the disclosure, the high frequency communication apparatus for vehicle may be used in various communication schemes such as e.g., vehicle to everything (V2X) communication, fourth generation (4G) communication, and fifth generation communication. For example, the V2X communication may include vehicle to vehicle (V2V), vehicle to infrastructure (V2I), vehicle to pedestrian (V2P), vehicle to network (V2N) communications, etc.

Throughout the specification, the term "transmit" and its derivatives mean sending a signal from a communication module to an antenna module via a cable, and the term "receive" and its derivatives mean receiving a signal at the communication module from the antenna module via the cable. For example, a transmit (TX) radio frequency (RF) signal is sent to the antenna module from the communication module via the cable and then transmitted through an antenna. Conversely, a receive (RX) RF signal is received at the antenna and sent to the communication module from the antenna module via the cable FIG. 1 shows a car body of a vehicle, according to an embodiment of the disclosure.

Referring to FIG. 1, a vehicle 1 is a machine that includes wheels that are driven for the purpose of transportation of humans or goods. The vehicle 1 may travel along a road. The vehicle 1 includes a car body 10 defining the external shape of the vehicle 1, a chassis (not shown), the remaining portion of the vehicle 1 other than the car body 10, on which mechanical equipment required for driving is installed, and electric control devices for protecting the driver and provide user convenience for the driver.

As shown in FIG. 1, the exterior of the car body 10 may include a front panel 11, a hood 12, a roof panel 13, a rear panel 14, and front/rear/left/right doors 15. To provide a clear view for the driver, there may be a front window 16 installed on the front of the car body 10, wing mirrors 17 and side windows 18 installed on the sides of the car body 10, and a rear window 19 installed on the rear side of the car body 10.

The electric control devices of the vehicle 1 may control various devices of the vehicle 1 and provide the driver with comfort or safety, and may include at least one of e.g., an engine management system, a transmission control unit, an electronic braking system, an electric power steering system, a body control module, a display, a heating/ventilation/air conditioning system, an audio system, or a telematics unit. The electric control devices of the vehicle 1 may also include a high frequency communication apparatus 100 so that the vehicle is capable of wireless communication. The high frequency communication apparatus 100 for vehicle may be understood as part of the telematics unit, but is not limited thereto. Furthermore, the high frequency communication apparatus 100 for vehicle may be a device equipped in the vehicle 1 before or after the vehicle 1 is released on the market.

In an embodiment of the disclosure, the high frequency communication apparatus 100 for vehicle may include a communication module 110, an antenna module 150, and a cable 190.

For example, the communication module 110 may be arranged in a space behind rear seats of the car body 10, without being limited thereto. In another example, the communication module 110 may be arranged under the hood 12, near the driver's seat, near the roof panel 13, or the like.

The antenna module 150 may be arranged on the roof panel 13, the front window 16, the wing mirror 17, the rear window 19, or the like. The antenna module 150 may be detachably coupled to the cable 190 by a connector.

In an embodiment of the disclosure, the cable 190 may be a single cable. The cable 190 may be a coaxial cable that electrically connects the communication module 110 to the antenna module 150. The communication module 110 and the antenna module 150 may be installed a few meters away from each other in the vehicle 1 due to their design, but is not limited thereto.

Figure 2:
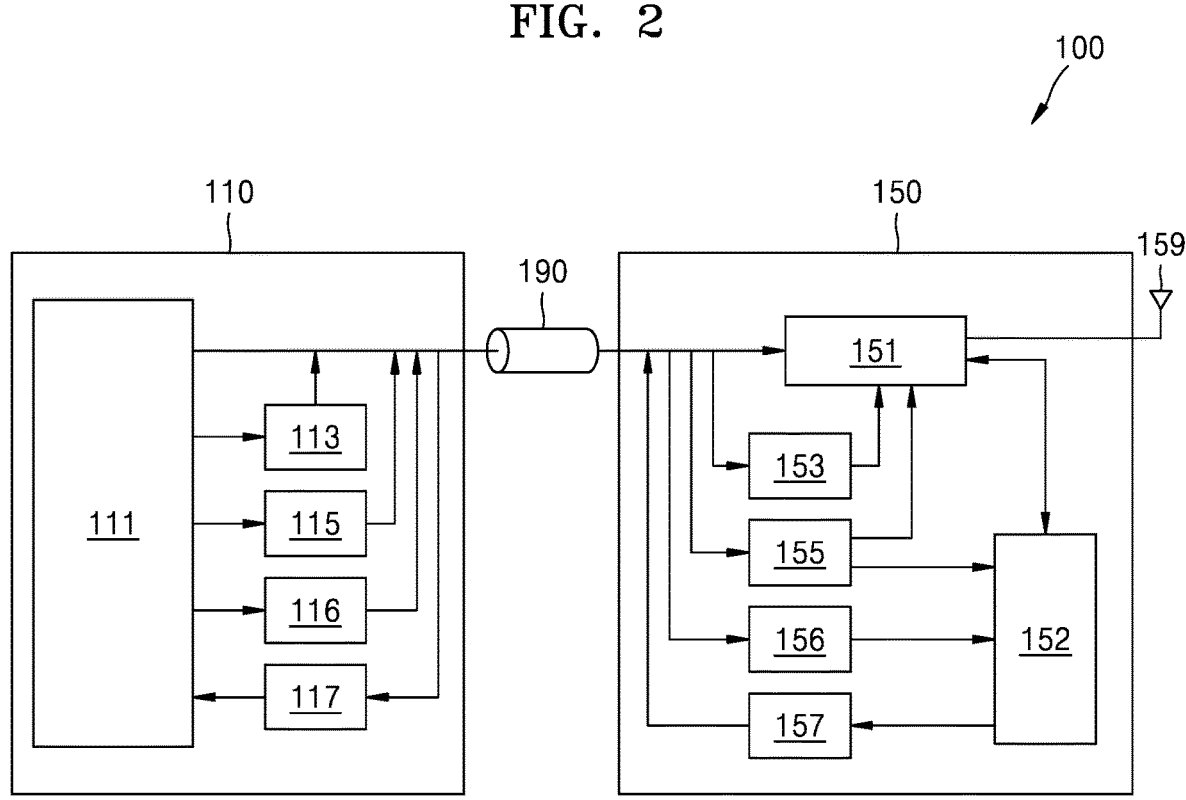
FIG. 2 is a block diagram of a high frequency communication apparatus for vehicle, according to an embodiment of the disclosure.

FIG. 2 is a block diagram of the high frequency communication apparatus 100 for vehicle, according to an embodiment of the disclosure.

Referring to FIG. 2, the high frequency communication apparatus 100 for vehicle may include the communication module 110, the antenna module 150, and the cable 190.

In an embodiment of the disclosure, the communication module 110 may include an RF circuit 111. The RF circuit 111 may be a circuit for processing an RF signal, and may include a modem circuit, a radio frequency integrated circuit (RFIC), a radio frequency front end (RFFE), etc. The modem circuit may be a circuit for e.g., 5G or V2X communication. The communication module 110 may be part of the electric control device (e.g., telematics control unit (TCU)) in the vehicle 1, or may be controlled by a processor (e.g., an application processor (AP) of the TCU) of the electric control device. The processor may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

RF signals processed by the communication module 110 may include different RF signals having different frequencies or are in different communication schemes.

The communication module 110 may distinguish between transmission (TX) and reception (RX) of the RF signal by a time division duplexing (TDD) method. The RF circuit 111 may output a TX/RX control signal to distinguish between TX and RX. For example, TX/RX control signal '1' indicates a TX mode, and TX/RX control signal '0' indicates an RX mode. The TX/RX control signal is modulated to an alternating current (AC) signal of a certain frequency in a TX/RX control signal modulation circuit (hereinafter, a first modulation circuit) 113, and is then carried on the cable 190. The first modulation circuit 113 may include a direct current (DC) to AC circuit, a frequency oscillator, a band pass filter, etc. For example, the DC to AC circuit modulates the TX/RX control signal '1' to an AC signal. The TX/RX control signal '0' may not include an AC component even after being modulated in the DC to AC circuit. The band pass filter may include e.g., an LC filter. The modulated TX/RX control signal may have a different frequency from that of the transmitted or received RF signal. In an embodiment of the disclosure, modulation of the TX/RX control signal may be performed in the RF circuit 111.

The communication module 110 may distinguish between TX and RX of the RF signal by using a frequency division duplexing (FDD) method. In the case of using the FDD method, TX frequency and RX frequency of the RF signal may be differentiated based on frequency. In this case, the extra TX/RX control signal may not be needed.

The communication module 110 may further include a power circuit 115. The power circuit 115 may supply DC power. The power circuit 115 may convert power from the vehicle 1 into a voltage (e.g., 5 volts (V)) required by the high frequency communication apparatus 100 for vehicle. The power circuit 115 may supply the power to various circuits in the antenna module 150 and communication module 110. The power circuit 115 may include e.g., a low dropout linear regulator (LDO). When the RF circuit 111 sends an enable signal to the power circuit 115, the power circuit 115 supplies DC power.

An RF block filter (not shown in FIG. 2) may further be provided at an output end of the power circuit 115 to prevent an RF signal from entering to the power circuit 115. The RF block filter may include e.g., an LC filter.

In an embodiment of the disclosure, the power circuit 115 for supplying power to the antenna module 150 may be provided separately from the communication module 110.

In an embodiment of the disclosure, the communication module 110 may include a serial communication module for transmitting or receiving a serial communication signal. The serial communication module may be arranged in the RF circuit 111 or arranged separately.

In an embodiment of the disclosure, the communication module 110 may use a serial communication module based on the universal asynchronous receiver/transmitter (UART)

scheme. For example, a TX serial communication signal (e.g., UART TXD) output from the RF circuit 111 may be a digital signal comprised of 0(s) and 1(s). The UART scheme may have separate data lines for transmission and reception. The communication module 110 may include a TX serial communication modulation circuit (hereinafter, a second modulation circuit) 116 for TX serial communication, and an RX serial communication demodulation circuit (hereinafter, a first demodulation circuit) 117 for RX serial communication.

The second modulation circuit 116 may include a DC to AC circuit, a frequency oscillator, a band pass filter, etc. A TX serial communication signal (digital signal) output from the serial communication module may be modulated to an AC signal in the second modulation circuit 116, may pass the band pass filter, and may then be carried on the cable 190. The AC signal modulated from the TX serial communication signal may have a different frequency from that of an AC signal modulated from an RX serial communication signal, which will be described later. Specifically, a signal from a frequency oscillator supplied to the DC to AC circuit of the second modulation circuit 116 may have a different frequency from the frequency of the AC signal modulated from the RX serial communication signal.

The first demodulation circuit 117 may include a band pass filter, an AC to DC circuit, etc. An RX serial communication signal transmitted from the antenna module 150 may be an AC signal modulated in the antenna module 150, as will be described later. The modulated RX serial communication signal passes a band pass filter 225 and is then converted to a digital signal in the AC to DC circuit.

The communication module 110 may use peripheral component interconnect express (PCIE) or other well-known serial communication schemes.

The TX serial communication signal may include a control command for the antenna module 150 to perform an operation to compensate for a loss in the cable 190 or a self-calibration operation.

The TX serial communication signal may include control commands or data for antenna switching, antenna impedance change, RF power back off, antenna diagnosis operations, etc., which are implemented in the antenna module 150. For example, the TX serial communication signal may include information indicating the start of the compensation operation or self-calibration operation of the antenna module 150, or a diagnosis message indicating the result of the self-calibration.

The antenna module 150 may also serve as a serial communication interface for devices performing various other functions aside from wireless communication (e.g., various sensors, lamps, tollgate passing terminals such as Hi-pass in Korea and E-ZPass in the U.S., etc.), and the TX serial communication signal may include control commands or data for operation of these devices.

The antenna module 150 may include a front end module (FEM) 151, a controller 152, and an antenna 159. The antenna 159 may be installed directly on a printed circuit board (PCB) of the antenna module 150, or connected to the PCB by a very short cable.

The FEM 151 is a circuit for amplifying a received or transmitted RF signal or canceling noise from the RF signal, including an amplifier such as a pre-amplifier (PA) and a low noise amplifier (LNA).

The FEM 151 may have a plurality of gain modes that may be selected under the control of the communication module 110. For example, the plurality of gain modes may include a low power mode and a high power mode.

The FEM 151 may further include a detection circuit for detecting errors or detecting power of an RF signal input or output for signal compensation.

When the TDD method is used to distinguish between TX and RX, the FEM 151 may include a TX/RX switch. The TX/RX switch may be e.g., a single pole double throw (SPDT) circuit. The TX/RX switch may switch between TX mode and RX mode based on a TX/RX control signal transmitted through the cable 190.

RF signals transmitted or received by the antenna module 150 may have different frequencies or be in different communication schemes, so the FEM 151 may include a separate circuit for each RF signal or circuits that universally support two or more kinds of RF signals.

The antenna module 150 may include a TX/RX control demodulation circuit (hereinafter, second demodulation circuit) 153 that includes a band pass filter, an AC to DC circuit, etc., to demodulate the TX/RX control signal. The pass band of the band pass filter of the second demodulation circuit 153 may be the frequency of the TX/RX control signal modulated in the first modulation circuit 113 of the communication module 110.

The TX/RX control signal transmitted through the cable 190 is an AC signal modulated at a certain frequency, which may be demodulated by the second demodulation circuit 153 back to the original digital signal.

In the case of using the FDD scheme to distinguish between TX and RX, a duplexer may be used instead of the TX/RX switch in an embodiment of the disclosure.

The antenna module 150 may include a power circuit 155. The power circuit 155 may use a circuit including a capacitor to separate DC power delivered from the communication module 110 through the cable 190 from an RF signal and a TX/RX serial communication signal. The power circuit 155 may convert the DC power delivered through the cable 190 into a voltage (e.g., 3.3V) required by the antenna module 150 and supply the voltage to various circuits and elements in the antenna module 150. The power circuit 155 may include e.g., an LDO. An RF block filter (not shown in FIG. 2) may be provided between the cable 190 and the power circuit 155 to prevent an RF signal from entering to the power circuit 155.

The antenna module 150 may include additional devices that perform functions other than wireless communication, in which case the power circuit 155 may supply power even to those devices.

The controller 152 may be a micro controller unit (MCU). The controller 152 may control general operation of the antenna unit 150 including the FEM 151. The controller 152 may be configured to control the communication module 110 or perform self error detection or signal compensation.

The TX serial communication signal transmitted from the communication module 110 through the cable 190 is demodulated to a digital signal in a TX serial communication demodulation circuit (hereinafter, a third demodulation circuit) 156. The third demodulation circuit 156 may include a band pass filter, an AC to DC circuit, etc., to demodulate the TX serial communication signal. The pass band of the band pass filter of the third demodulation circuit 156 may be the frequency of the TX serial communication signal modulated in the second modulation circuit 116 of the communication module 110. The TX serial communication signal demodulated in the third demodulation circuit 156 is input to the controller 152.

The controller 152 may be configured to receive the TX serial communication signal transmitted from the communication module 110, and perform a certain operation (e.g., antenna switching, antenna impedance change, RF power back off, antenna diagnosis, etc.). As such, the TX serial communication signal may include control commands or data for antenna switching, antenna impedance change, RF power back off, antenna diagnosis, etc. For example, when the high frequency communication apparatus 100 performs Bluetooth communication, complicated operations such as controlling switching of a Bluetooth antenna between inside and outside of the vehicle 1 are required, which may be performed by the controller 152 according to a control command included in the TX serial communication signal transmitted from the communication module 110.

The controller 152 may output and send an RX serial communication signal to the communication module 110. The RX serial communication signal is a digital signal comprised of 0(s) and 1(s), which is modulated to an AC signal of a certain frequency in an RX serial communication modulation circuit (hereinafter, a third modulation circuit) 157.

The third modulation circuit 157 may include a DC to AC circuit, a frequency oscillator, a band pass filter, etc. An RX serial communication signal (digital signal) output from the controller 152 may be modulated to an AC signal in the third modulation circuit 157, may pass the band pass filter, and may then be carried on the cable 190. The AC signal modulated from the RX serial communication signal may have a different frequency from that of an AC signal modulated from the aforementioned TX serial communication signal. Specifically, a signal from the frequency oscillator supplied to the DC to AC circuit of the third modulation circuit 157 may have a different frequency from that of the AC signal modulated from the TX serial communication signal.

An RX serial communication signal may include antenna impedance information of the antenna module 150, gain information of the FEM 151, antenna diagnosis information, etc.

The antenna module 150 may further include a memory (not shown). The memory may store data related to antenna operations as well as data related to controlling devices that perform functions other than wireless communication.

In an embodiment of the disclosure, the cable 190 may be a coaxial cable. The coaxial cable is a coaxial transmission line having a cross-section of concentric circles, including an inner conductor and an outer conductor, such that current or signal may be transmitted with minimal loss. For example, polyethylene steatite insulation may be placed between the inner conductor and the outer conductor, to mechanically lock the inner conductor and outer conductor in their appropriate positions and reduce attenuation.

A TX RF signal, a TX/RX control signal, and a TX serial communication signal may be transmitted to the antenna module 150 from the communication module 110 via the cable 190. Furthermore, DC power may be transmitted to the antenna module 150 from the communication module 110 via the cable 190. An RX RF signal and an RX serial communication signal may be transmitted to the communication module 110 from the antenna module 150 via the cable 190. The transmitted and received signals may all be modulated at different frequencies and carried on the cable 190, and the receiving end of a signal may receive the signal at a desired frequency by using a band pass filter suited for that frequency. Specifically, the frequency of the transmitted or received RF signal, the frequency of the modulated TX/RX control signal, the frequency of the modulated TX serial communication signal, and the frequency of the modulated RX serial communication signal may all be in different frequency bands. For example, the frequency of the RF signal may be in the 5.9 GHZ band. The frequency of the modulated TX/RX control signal may be 110 MHz. The frequency of the modulated TX serial communication signal may be 65 MHz. The frequency of the modulated RX serial communication signal may be 2 MHz.

The TX serial communication signal may include a control command or data to operate a device performing functions other than the wireless communication (e.g., various sensors, lamps, tollgate passing terminals, etc.), and the RX serial communication signal may include many different types of data resulting from controlling the device. The controller 152 may control the device, and communicate the associated control command or data with the communication module 110 in the TX/RX serial communication signal. In other words, the antenna module 150 may also serve as a serial communication interface for the device that performs functions other than wireless communication.

There are numerous devices designed for vehicles in the vehicle 1 that are needed for reliable vehicular operation in addition to wireless communication. For reliable control of these devices and communication between them, delivering the RF signal and digital signal is important. The RF signals and digital signals need to be delivered using the cable 190 in the vehicle 1 between the side of the antenna module 150 that receives RF signals and the device to be controlled, in which case RF signals, DC power, and various interface (e.g., a UART, a PCIE, etc.) signals for a controller (e.g., an MCU, an IC, etc.) of the device are carried on the single cable 190 for the antenna module 150 in order for the device to perform independent operations.

Detailed examples of installed antenna modules of the high frequency communication device will now be described.

Figure 3:
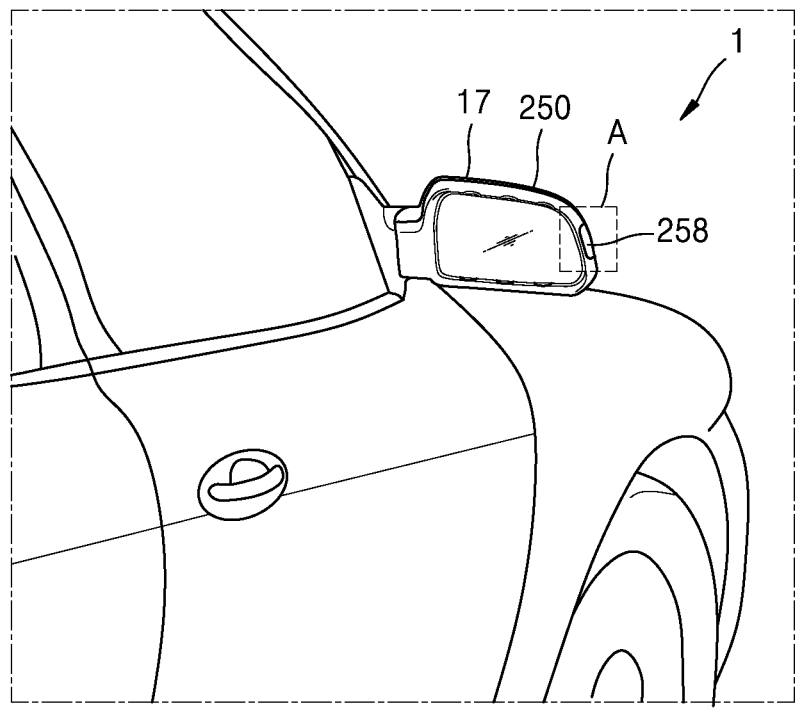
FIG. 3 shows an example of an installed antenna module, according to an embodiment of the disclosure.
Figure 4:
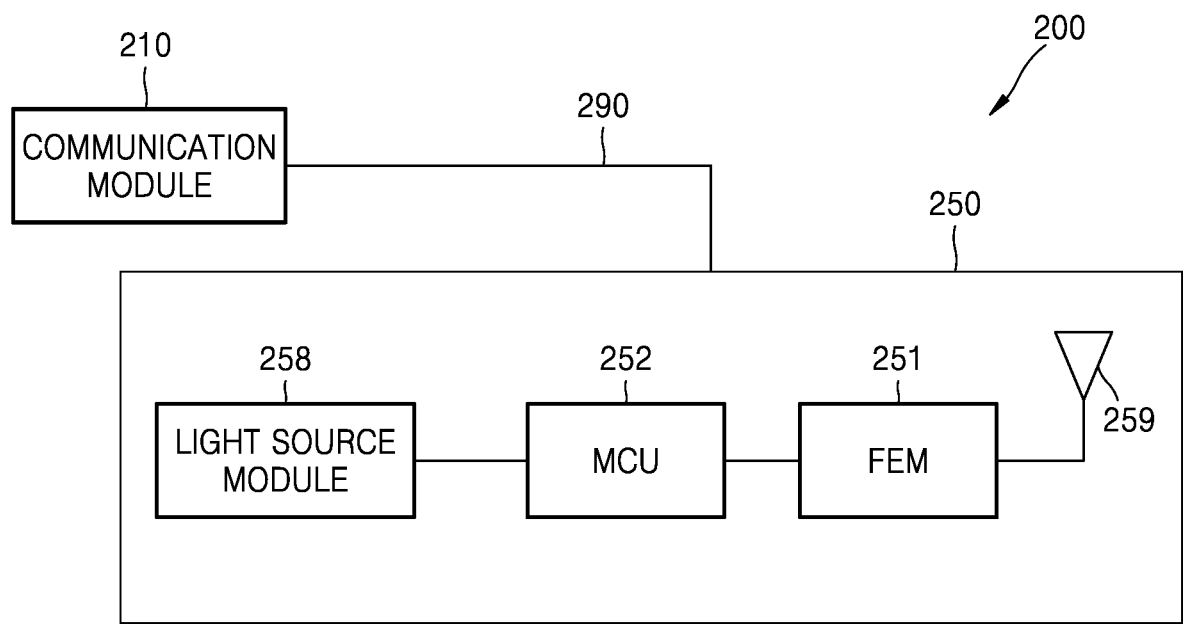
FIG. 4 is a block diagram of a high frequency communication apparatus for vehicle including the antenna module of FIG. 3.

FIG. 3 shows an example of an installed antenna module 250, according to an embodiment of the disclosure, and FIG. 4 is a block diagram of a high frequency communication apparatus 200 for vehicle including the antenna module 250 of FIG. 3.

Referring to FIGS. 3 and 4, the high frequency communication apparatus 200 for vehicle may include a communication module 210, an antenna module 250, and a cable 290 connecting the communication module 210 to the antenna module 250. The cable 290 may be a coaxial cable. Among elements of the communication module 210 and the antenna module 250, those that overlap with those described above will not be described again for the sake of simplicity. The antenna module 250 may be mounted on one side A of the wing mirrors 17.

The wing mirror 17 is equipped with a turn indication lamp (a light module) 258. The turn indication lamp 258 may include a light source such as a light emitting diode (LED) or a lamp, and a light source driving circuit for driving the light source.

The antenna module 250 may perform not only a wireless communication function but also a control interface function for the turn indication lamp 258. The antenna module 250 may include the turn indication lamp 258 or the driving circuit for the turn indication lamp 258.

The communication module 210 receives a control command for the turn indication lamp 258 from an electronic control device and transmits the control command to the antenna module 250. The control command for the turn indication lamp 258 may be delivered by modulating a serial communication signal to an AC signal. In other words, a TX serial communication signal may include the control command for the turn indication lamp 258.

Although the wing mirror 17 is shown as including the turn indication lamp 258 in this embodiment of the disclosure, the wing mirror 17 may include a rear camera and/or a side camera. In this case, the antenna module 250 may include the rear camera and/or the side camera, or serve as a serial communication interface to control the rear camera and/or the side camera.

Figure 5:
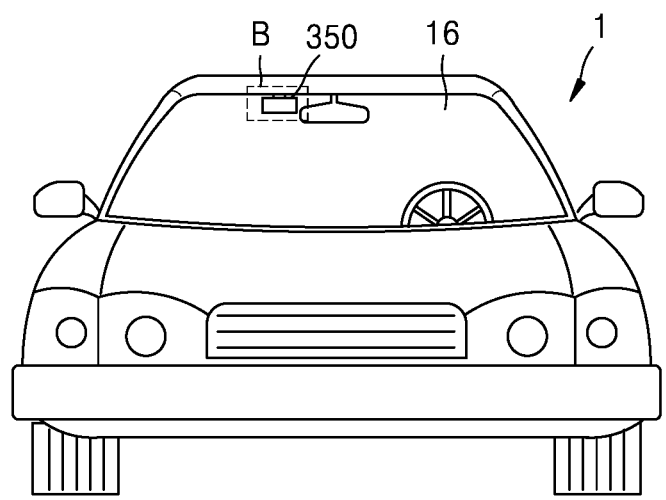
FIG. 5 shows another example of an installed antenna module, according to another embodiment of the disclosure.
Figure 6:
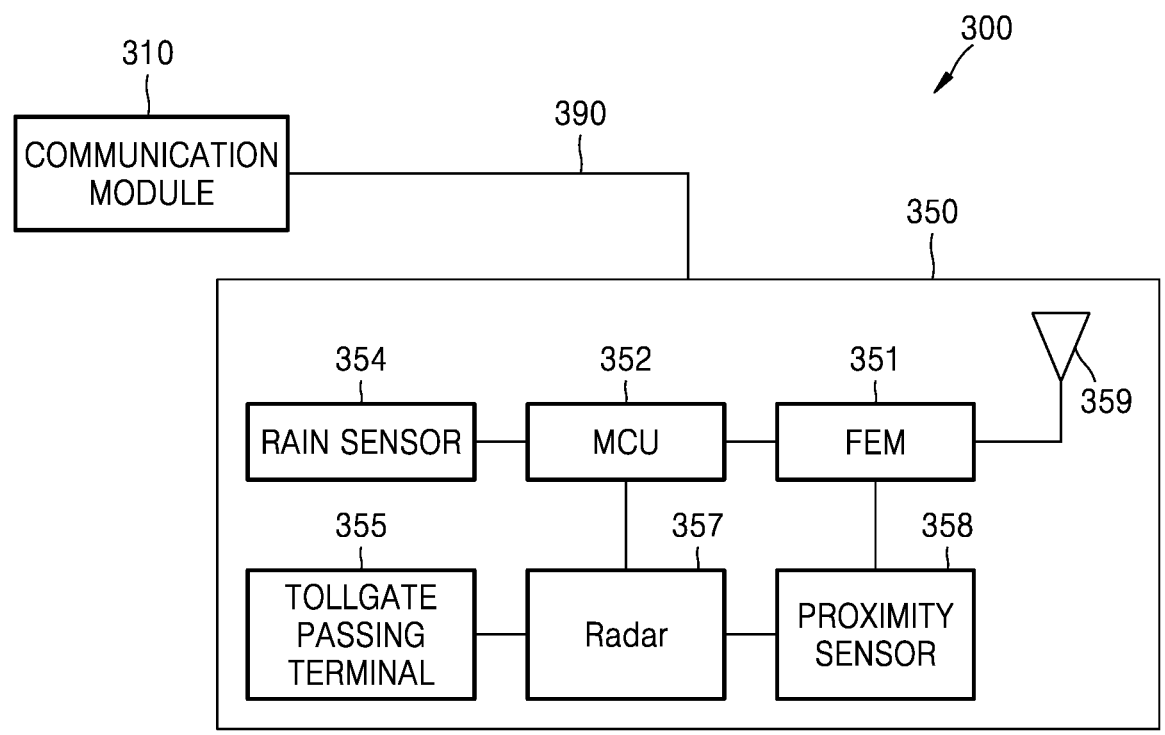
FIG. 6 is a block diagram of a high frequency communication apparatus for vehicle including the antenna module of FIG. 5.

FIG. 5 shows another example of an installed antenna module 350, according to an embodiment of the disclosure, and FIG. 6 is a block diagram of a high frequency communication apparatus 300 for vehicle including the antenna module 350 of FIG. 5.

Referring to FIGS. 5 and 6, the high frequency communication apparatus 300 for vehicle may include a communication module 310, an antenna module 350, and a cable 390 connecting the communication module 310 to the antenna module 350. The cable 390 may be a coaxial cable.

The antenna module 350 may be mounted on an upper end area B of the front window 16. The antenna module 350 may include an FEM 351, a controller 352, and an antenna 359 for performing wireless communication. Furthermore, the antenna module 350 may include various other components such as rain sensor 354, tollgate passing terminal module 355, radar module 357, proximity sensor 358, etc. The antenna module 350 may serve as a control interface for these various other components.

In an embodiment of the disclosure, the rain sensor 354 may detect rain drops falling on the front window 16. The controller 352 of the antenna module 350 may control the rain sensor 354 and sends detection information about detected rain drops to the communication module 310. The control command for the rain sensor 354 or the detection information about the rain drops may be transmitted or received through the cable 390 by modulating a serial communication signal to an AC signal. In other words, a TX serial communication signal may include the control command for the rain sensor 354, and an RX serial communication signal may include status information of the rain sensor 354 and rain detection information.

The tollgate passing terminal module 355 is a device that uses infrared or RF signals to wirelessly communicate with an antenna installed at a tollgate for making electronic payments. Control commands or data for the tollgate passing terminal module 355 may be transmitted or received by the communication module 310 through the cable 390 by modulating a serial communication signal to an AC signal. In other words, a TX serial communication signal may include the control command for the tollgate passing terminal module 355. An RX serial communication signal may include status information or tollgate payment information of the tollgate passing terminal module 355.

The radar module 357 includes a sensor for emitting electromagnetic waves and detecting reflected electromagnetic waves to detect objects on the road using the reflected electromagnetic waves. The radar module 357 may include at least one of a pulse Doppler radar, a continuous wave (CW) radar, a frequency modulated continuous wave (FMCW) radar, a multiple frequency CW radar, or a pulse compression radar. A control command for the radar module 357 or information obtained from the radar module 357 may be transmitted or received by the communication module 310 through the cable 390 by modulating a serial communication signal to an AC signal. In other words, a TX serial communication signal may include the control command for the radar module 357. An RX serial communication signal may include status information of the radar module 357 or information obtained from the radar module 357. In an embodiment of the disclosure, the antenna module 350 may further include Sonar, Vison, Lidar, radar sensor system, etc., as devices for detecting road conditions while the vehicle 1 is moving, in addition to the radar module 357.

The proximity sensor 358 is a device for detecting a person or object approaching the vehicle 1 by using, for example, infrared or RF signals. A control command for the proximity sensor 358 or information obtained from the proximity sensor 358 may be transmitted or received by the communication module 310 through the cable 390 by modulating a serial communication signal to an AC signal. In other words, a TX serial communication signal may include the control command for the proximity sensor 358. An RX serial communication signal may include status information of the proximity sensor 358 or information obtained from the proximity sensor 358.

The aforementioned rain sensor 354, tollgate passing terminal module 355, radar module 357, and proximity sensor 358 are devices used for controlling the vehicle 1 or providing convenience or information to the user, and the communication module 310 may communicate with various electric control devices in the vehicle 1 to receive control information from the electric control device and forward data received from those devices to the electric control device.

The embodiments as described above in connection with FIGS. 3 to 6 are only examples of certain installations of the antenna module 250 or 350, but the instant disclosure is not limited thereto. For example, the antenna module 250 or 350 may be installed in the front panel 11, roof panel 13, rear panel 14, or rear window 19.

Figure 7:
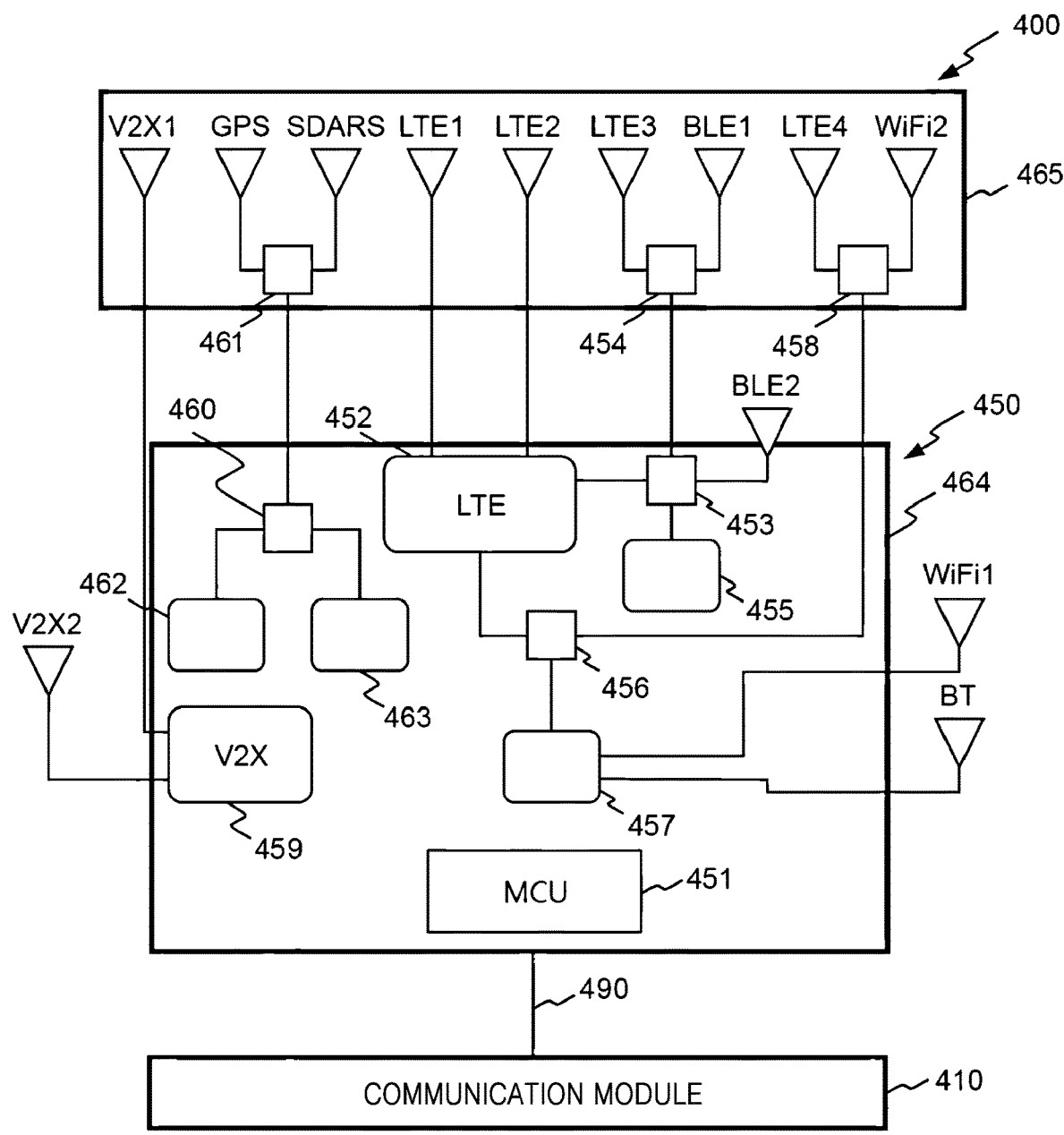
FIG. 7 is a block diagram of a high frequency communication apparatus for vehicle, according to another embodiment of the disclosure.

FIG. 7 is a block diagram of a high frequency communication apparatus 400 for vehicle, according to another embodiment of the disclosure.

Referring to FIG. 7, the high frequency communication apparatus 400 for vehicle is a device for transmitting or receiving a plurality of RF signals, and includes a communication module 410, an antenna module 450, and a cable 490. Parts of the high frequency communication apparatus 400 for vehicle that overlap the high frequency communication apparatus 100 for vehicle described above in connection with FIG. 2 will not be described in detail.

The communication module 410 processes a plurality of RF signals transmitted or received.

The RF signal to be processed by the communication module 410 may include signals for V2X communication, signals used in mobile communication such as 4G, 5G, etc., signals used in short-range communication such as Bluetooth (BT) and wireless fidelity (Wi-Fi), signals used in satellite digital audio radio service (SDARS), global positioning system (GPS) signal, etc.

The communication module 410 may include front end (FE) circuits for universally supporting the various different types of RF signals described above. These different types of RF signals may have different frequencies or are in different communication schemes. The FE circuits are employed to transmit or receive the RF signals.

The FE circuit of the antenna module 450 may include a long term evolution (LTE) module 452, a Bluetooth low energy (BLE) module 455, a Wi-Fi/BT module 457, a V2X module 459, a GPS module 462, or an SDARS module 463.

The antenna module 450 may include a plurality of antennas corresponding to different RF signals having different frequencies or communication schemes (V2X1, V2X2, GPS, SDARS, LTE1, LTE2, LTE3, LTE4, BLE1, BLE2, BT, Wi-Fi1, and Wi-Fi2). Some of the antennas (e.g., BLE2) may be installed directly on a circuit board 464 of the antenna module 450, and some others (e.g., V2X1, V2X2, GPS, SDARS, LTE1, LTE2, LTE3, LTE4, BLE1, BT, Wi-Fi1, and Wi-Fi2) may be installed in a separate antenna housing 465 or in another location and are connected to the circuit board 464 by a very short antenna cable. The term "very short antenna cable" may refer to an antenna cable that is sufficiently short such that signal loss due to high frequency is negligible. For example, a very short antenna cable may have a length of a few millimeters, a few centimeters, or tens of centimeters. Some of the plurality of antennas (e.g., BLE2, BT, and Wi-Fi2) may also be used for wireless communication inside the car body.

The antenna module 450 may include a duplex filter 460, SPDT switches 454, 456, and 458, a double pole double throw (DPDT) switch 453, or a diplexer, to separate out different RF signals that have different frequencies or are in communication schemes.

The antenna module 450 may include an LTE module 452. The LTE module 452 in this example is a mobile communication module, but there may further be a 4G or 5G module. For LTE communication, one or more antennas may be used. In FIG. 7, an example where four antennas LTE1, LTE2, LTE3, and LTE4 that are used for LTE communication is illustrated.

The antenna module 450 may include a BLE module 455. The BLE module 455 may perform BLE communication using one or more antennas. In FIG. 7, an example where two antennas BLE1 and BLE2 that are used for BLE communication is illustrated.

The antenna module 450 may include a Wi-Fi/BT module 457. The Wi-Fi/BT module 457 is an integrated module for supporting Wi-Fi communication and BT communication, and may be connected to e.g., an antenna for BT (BT) and two antennas for Wi-Fi (Wi-Fi1 and Wi-Fi2).

The antenna module 450 may include a V2X module 459. The V2X module 459 may use one or more antennas. In FIG. 7, an example where two antennas V2X1 and V2X2 that are used for V2X communication is illustrated.

The antenna module 450 may include a GPS module 462 and an SDARS module 463.

The GPS module 462 and the SDARS module 463 may be respectively connected to an antenna for GPS (GPS) and an antenna for SDARS.

Some communication may be used in combination with a different type of communication. For example, depending on the status of a communication network, switching may be performed between LTE communication, BLE communication, and Wi-Fi communication. For this, lines of some of the antennas (LTE1, LTE2, LTE3, and LTE4) used for LTE communication (e.g., LTE 3 and LTE 4) and lines of other communication antennas (e.g., BLE1 and BLE2) may be selectively connected by switching operation of the DPDT switch 453 and the SPDT switches 454 and 458 under the control of the controller 451.

Wireless communication may also be performed inside the vehicle 1. For example, while in BLE/BT communication, antennas BLE1, BLE2, and BT may be switched between inside and outside of the vehicle 1 under the control of the controller 451.

Some antennas (e.g., GPS, SDARS) may be connected to the circuit board 464 via a common antenna cable, and may be branched to the GPS module 462 and the SDARS module 463 by the duplexer filter 460.

As described above, the antenna module 450 may include the controller 451 for controlling the plurality of antennas and FE circuits for supporting the antennas to transmit or receive different RF signals having different frequencies or communication schemes. The controller 451 may be configured to perform complicated switching between the plurality of antennas and the FE circuits as well as complicated functions such as backup antenna switching for emergency call (E-Call) or specific absorption rate (SAR) back off.

The high frequency communication apparatuses 100, 200, 300 and 400 use the single cable 190, 290, 390, and 490, respectively, and enable control of the antenna module 150, 250, 350, and 450 itself or control of a device that performs functions other than wireless communication, so that the vehicle manufacturer may reduce cost and solve design and space constraints by eliminating the need for extra cables.

According to the disclosure, the high frequency communication apparatus for vehicle may perform serial communication through a single cable and an antenna module.

According to the disclosure, the high frequency communication apparatus for vehicle may be able to control operation of an antenna in an antenna module through a single cable and the antenna module.

According to the disclosure, the high frequency communication apparatus for vehicle may be able to control other devices through a single cable and an antenna module.

Several embodiments of the disclosure of the high frequency communication apparatus for vehicle have been described above, but a person of ordinary skill in the art will understand and appreciate that various modifications can be made without departing the scope of the disclosure. Thus, it will be apparent to those of ordinary skill in the art that the true scope of technical protection is only defined by the following claims.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. A high frequency communication apparatus for a vehicle using a single cable comprising:
a communication module connected to an end of the single cable and configured to transmit a radio frequency (RF) signal and a transmit (TX) serial communication signal, the communication module including a TX serial communication modulation circuit configured to modulate the TX serial communication signal from a first digital signal to a first alternate current (AC) signal in a first frequency band different from a second frequency band of the RF signal, and a receive (RX) serial communication demodulation circuit configured to demodulate a modulated RX serial communication signal received through the single cable to a second digital signal; and an antenna module connected to an other end of the single cable and configured to receive and branch the RF signal and the TX serial communication signal, the antenna module including a front end module configured to process the RF signal, a TX serial communication demodulation circuit configured to demodulate the TX serial communication signal from the first AC signal to the first digital signal, a controller configured to receive the demodulated TX serial communication signal to control the front end module and output an RX serial communication signal, and an RX serial communication modulation circuit configured to modulate the RX serial communication signal to a second AC signal in a third frequency band different from the second frequency band of the RF signal and the first frequency band of the TX serial communication signal.

2. The high frequency communication apparatus of claim 1, wherein the RF signal is transmitted or received according to a time division duplex scheme or a frequency division duplex scheme.

3. The high frequency communication apparatus of claim 1, wherein the communication module further comprises a TX/RX control signal modulation circuit configured to modulate a TX/RX control signal to control TX/RX mode of the RF signal from a third digital signal to a third AC signal, wherein a fourth frequency band of the third AC signal of the TX/RX control signal is different from the second frequency band of the RF signal, the first frequency band of the TX serial communication signal, and the third frequency band of the RX serial communication signal, and
wherein the antenna module further comprises a TX/RX control signal demodulation circuit configured to demodulate a transmitted TX/RX control signal from the third AC signal to the third digital signal.

4. The high frequency communication apparatus of claim 1, wherein the communication module further comprises a power circuit configured to supply power to the antenna module via the single cable.

5. The high frequency communication apparatus of claim 1, wherein the antenna module further comprises:
a device configured to perform functions other than wireless communication; or
a serial communication interface configured to control the device, and
wherein the TX serial communication signal and/or the RX serial communication signal include a control command or data for the device.

6. The high frequency communication apparatus of claim 5, wherein the antenna module is installed at a wing mirror and the device further comprises a turn indication lamp.

7. The high frequency communication apparatus of claim 5, wherein the antenna module is installed at a front window, and the device further comprises a rain sensor, a tollgate passing terminal module, a radar module, and/or a proximity sensor.

8. The high frequency communication apparatus of claim 1, wherein the communication module is configured to transmit or receive a plurality of RF signals having different frequencies or are in different communication schemes,
wherein the antenna module further comprises a plurality of antennas and a plurality of front end circuits corresponding to the plurality of RF signals, and
wherein the controller is further configured to control the plurality of antennas and the plurality of front end circuits.

9. The high frequency communication apparatus of claim 8, wherein the plurality of RF signals further comprise a vehicle to everything (V2X) communication signal, a mobile communication signal, a short-range communication signal, a satellite digital radio service (SDARS) signal, and/or a global positioning system (GPS) signal.

10. The high frequency communication apparatus of claim 1, wherein the single cable is a coaxial cable.

11. A high frequency communication apparatus for a vehicle comprising:
a cable;
a communication module connected to an end of the cable and configured to transmit a radio frequency (RF) signal and a transmit (TX) serial communication signal, the communication module including a TX serial communication modulation circuit configured to modulate the TX serial communication signal from a first digital signal to a first alternate current (AC) signal in a first frequency band different from a second frequency band of the RF signal; and
an antenna module connected to an other end of the cable and configured to receive and branch the RF signal and the TX serial communication signal, the antenna module including:
a front end module configured to process the RF signal,
a TX serial communication demodulation circuit configured to demodulate the TX serial communication signal from the first AC signal to the first digital signal, and
a controller configured to receive the demodulated TX serial communication signal to control the front end module and output an RX serial communication signal.

12. The high frequency communication apparatus of claim 11, wherein the communication module further comprises a receive (RX) serial communication demodulation circuit configured to demodulate a modulated RX serial communication signal received through the cable to a second digital signal, and
wherein the antenna module further comprises an RX serial communication modulation circuit configured to modulate the RX serial communication signal to a second AC signal in a third frequency band different from the second frequency band of the RF signal and the first frequency band of the TX serial communication signal.

13. The high frequency communication apparatus of claim 12, wherein the communication module further comprises a TX/RX control signal modulation circuit configured to modulate a TX/RX control signal to control TX/RX mode of the RF signal from a third digital signal to a third AC signal, wherein a fourth frequency band of the third AC signal of the TX/RX control signal is different from the second frequency band of the RF signal, the first frequency band of the TX serial communication signal, and the third frequency band of the RX serial communication signal, and
wherein the antenna module further comprises a TX/RX control signal demodulation circuit configured to demodulate a transmitted TX/RX control signal from the third AC signal to the third digital signal.

14. The high frequency communication apparatus of claim 11, wherein the RF signal is transmitted or received according to a time division duplex scheme or a frequency division duplex scheme.

15. The high frequency communication apparatus of claim 11, wherein the communication module further comprises a power circuit configured to supply power to the antenna module via the cable.

16. The high frequency communication apparatus of claim 11, wherein the antenna module further comprises:
   a device configured to perform functions other than wireless communication; or
   a serial communication interface configured to control the device, and
   wherein the TX serial communication signal and/or the RX serial communication signal include a control command or data for the device.

17. The high frequency communication apparatus of claim 16, wherein the antenna module is installed at a wing mirror and the device further comprises a turn indication lamp.

18. The high frequency communication apparatus of claim 16, wherein the antenna module is installed at a front window, and the device further comprises a rain sensor, a tollgate passing terminal module, a radar module, and/or a proximity sensor.

19. The high frequency communication apparatus of claim 11, wherein the communication module is configured to transmit or receive a plurality of RF signals having different frequencies or are in different communication schemes,
   wherein the antenna module further comprises a plurality of antennas and a plurality of front end circuits corresponding to the plurality of RF signals, and
   wherein the controller is further configured to control the plurality of antennas and the plurality of front end circuits.

20. The high frequency communication apparatus of claim 19, wherein the plurality of RF signals further comprise a vehicle to everything (V2X) communication signal, a mobile communication signal, a short-range communication signal, a satellite digital radio service (SDARS) signal, and/or a global positioning system (GPS) signal.

* * * * *